Sept. 21, 1954          C. R. WAGNER          2,689,855
PRODUCTION OF ALKENYLTHIOPHENES
Original Filed Nov. 26, 1943
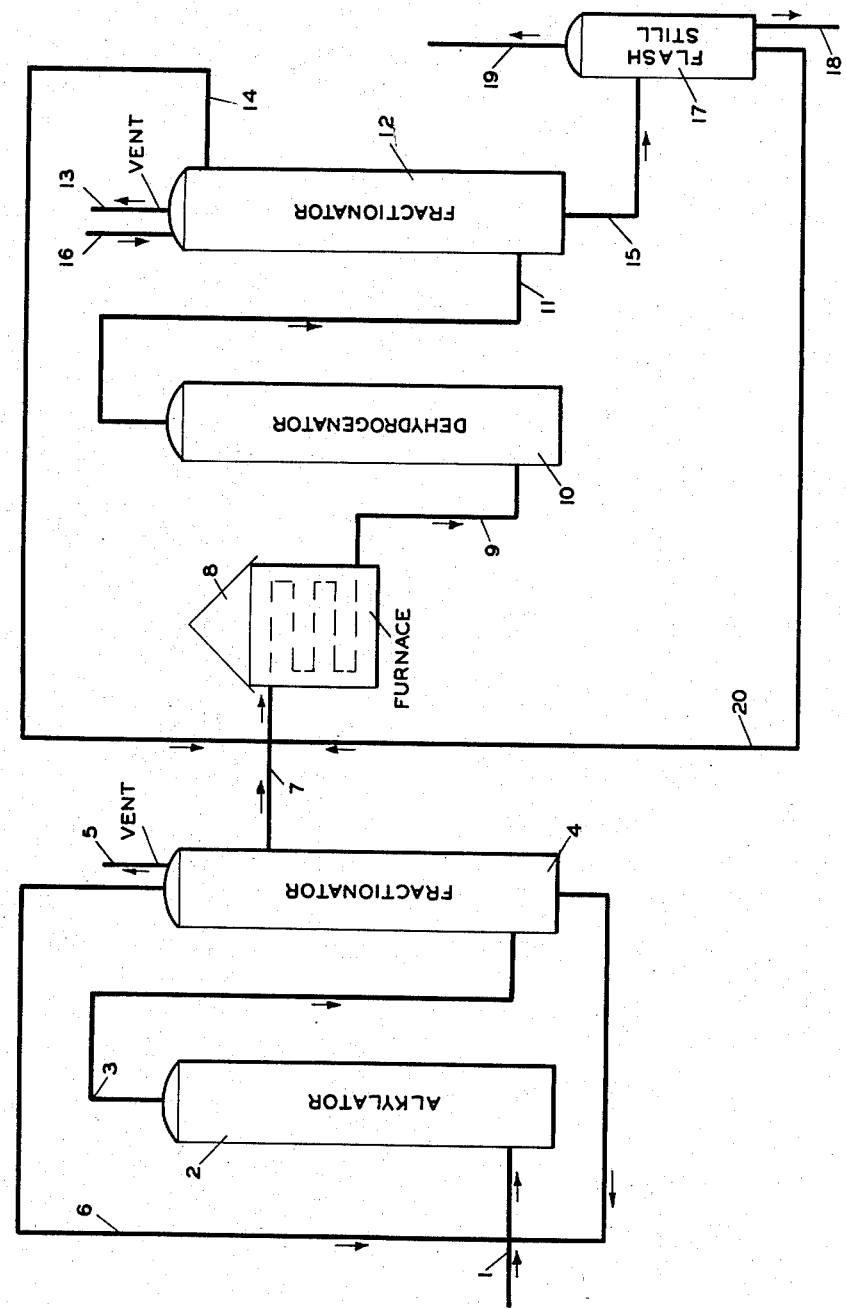
*INVENTOR.*
C. R. WAGNER
BY *Hudson & Young*
*ATTORNEYS*

Patented Sept. 21, 1954

2,689,855

UNITED STATES PATENT OFFICE 2,689,855

PRODUCTION OF ALKENYLTHIOPHENES

Cary R. Wagner, Utica, Ohio, assignor to Phillips Petroleum Company, a corporation of Delaware Original application November 26, 1943, Serial No. 511,893, now Patent No. 2,560,610, dated July 17, 1951. Divided and this application July 6, 1951, Serial No. 235,501

18 Claims. (Cl. 260—329)

The present invention relates to the production of alkenylthiophenes and, more particularly, to the production of 2-vinylthiophene by ethylation of thiophene to produce 2-ethylthiophene and dehydrogenation of the resulting 2-ethylthiophene to 2-vinylthiophene. The invention also pertains to a continuous process for the production of 2-vinylthiophene from thiophene and ethylene.

2-vinylthiophene or alpha-vinylthiophene, as well as 2-ethylthiophene or alpha-vinylthiophene, are known compounds. 2-vinylthiophene has been prepared by heating 2-thienylmethylcarbinol in the presence of a small amount of hydroquinone with gentle boiling in a stream of nitrogen to 145° C. Its boiling point was reported as 62° to 63° C. at a pressure of 50 millimeters of mercury (Kuhn and Dann, Annalen, 1941, vol. 547, page 293).

Other alkenylthiophenes which are known are 2-allylthiophene, 2-(alpha-ethylpropenyl)-thiophene, and 2-isopropenylthiophene. 2-allylthiophene or gamma-(alpha-thienyl)-alpha-propylene, which is reported to have a boiling point of 158.5° to 159° C. at a pressure of 732 millimeters of mercury, was prepared by treatment of the magnesium compound of alpha-iodothiophene with allyl bromide in ether (Grischkevitsch-Trochimovski, J. Russ. Phys. Chem. Soc., 1911, vol. 43, page 201; Chem. Zentr., 1911, vol I, page 1851). 2-(alpha-ethylpropenyl)-thiophene or gamma-(alpha-thienyl)-beta-amylene, which is a liquid having a boiling point of 90° to 91.5° C. at a pressure of 16 millimeters of mercury, was obtained by heating diethyl-alpha-thienylcarbinol with anhydrous oxalic acid at 120° C. (Dombratacheva, J. Russ. Phys. Chem. Soc., 1914, vol. 46, page 866; Chem. Zentr., 1915, vol. I, page 878). 2-isopropenylthiophene or beta-(alpha-thienyl)-propylene was obtained together with dimethyl-alpha-thienylcarbinol by reaction of alpha-thienyl magnesium iodide with acetone in absolute ether (Thomas, Bulletin, 1909, series 4, vol. 5, page 732; see also Compt. rend., 1908, vol. 146, page 642). The boiling point of 2-isopropenylthiophene is reported to be 166° to 167° C. at a pressure of 727 millimeters of mercury and 98° to 99° C. at a pressure of 25 millimeters.

2-ethylthiophene was prepared by the reaction of 2-iodothiophene with ethyl bromide and sodium in absolute ether (V. Meyer and Kresis, Berichte, 1884, vol. 17, page 1560). It has also been formed from 2-bromothiophene, ethyl bromide and sodium (Schleicher, Berichte, 1885, vol. 18, page 3016). Its boiling point is reported to be 132° to 134° C. Other isomers and homologues of 2-ethylthiophene are known. 3-ethylthiophene or beta-ethylthiophene, which is a liquid having a boiling point of 135° to 136° C., has been obtained by the distillation of sodium ethylbenzoate with phosphorus trisulfide (Damsky, Berichte, 1886, vol. 19, page 3284; Gerlach, Annalen, 1892, vol. 267, page 146). 2-propylthiophene, 3-propylthiophene, 2-isopropylthiophene, 3-isopropylthiophene and 2-butylthiophene are also known.

It is an object of the present invention to provide an improved process for the production of 2-vinylthiophene and its homologues and isomers.

A further object of the present invention is to provide a process for the production of alkenylthiophenes from olefins and thiophene.

A further object of the invention is to provide a process for the production of alkyl-substituted thiophenes from an olefin and thiophene and dehydrogenation of the alkyl-substituted thiophenes to alkenyl-substituted thiophenes.

It is another object of the present invention to provide a continuous process for the production of alkenylthiophenes from olefins and thiophene which involves the alkylation of thiophene with an olefin and dehydrogenation of the resulting alkylthiophene.

Other objects and advantages of the invention, some of which are referred to specifically hereinafter, will be apparent to those skilled in art to which the invention pertains.

According to the present invention, alkenylthiophenes are produced from thiophene and an olefin by alkylation of thiophene with an olefin and dehydrogenation of the resulting alkylthiophene. 2-vinylthiophene is produced, for example, by alkylation of thiophene with ethylene to produce 2-ethylthiophene, which is thereafter dehydrogenated to 2-vinylthiophene. The process is preferably conducted in a continuous manner as hereinafter more specifically described. The alkylation is effected in the presence of catalyst whereas the dehydrogenation may be catalytic, which is preferred, or simply a noncatalytic thermal dehydrogenation.

One specific embodiment of the present invention, which consists of a continuous process for the production of 2-vinylthiophene from thiophene and ethylene, is represented diagrammatically on the accompanying drawing. In this process, ethylene and thiophene are charged at suitable temperatures and pressures through conduit or line 1 to an alkylator 2. This alkylator contains a silica-alumina catalyst or other suitable alkylation catalyst. The thiophene is charged in substantial excess over that which would be required for its complete mono-alkylation by the ethylene charged.

The mixture after passing through alkylator 2 is then passed through conduit 3 to fractionator 4. Uncombined ethylene is discharged through vent 5 or is returned through conduit 6 to alkylator 2. In fractionator 4 a separation is also made between thiophene, ethylthiophene and any polyethylated thiophenes. The unethylated thiophene passes back through line 6 to alkylator 2. Ethylthiophene passes through conduit 7 to a furnace 8. Polyalkylated thiophenes, which accumulate at the bottom of fractionator 4, are recharged to alkylator 2, where they are partially dealkylated in the presence of the excess of thiophene.

The ethylthiophene is heated in furnace 8 to a suitable temperature for dehydrogenation and is then passed through conduit 9 to a dehydrogenator 10 which is charged with a suitable dehydrogenation catalyst. After being subjected to dehydrogenation, the product is passed through conduit 11 to a fractionator 12. In the event that noncatalytic dehydrogenation is to be used, dehydrogenator 10 is omitted and the desired thermal dehydrogenation is effected in furnace 8, which is a tube furnace, or other suitable pyrolysis apparatus, for example, a bath of lead or other molten metal, and the product is charged to fractionator 12.

Hydrogen and any low-boiling products which are formed in the dehydrogenation may be discharged from the fractionator through vent 13. In the fractionator a separation is made between 2-vinylthiophene, which is removed through a discharge outlet 15, and 2-ethylthiophene, which is the overhead and is returned to furnace 8 through conduit 14 for further dehydrogenation.

To prevent polymerization of 2-vinylthiophene during the distillation in fractionator 12, it is generally desirable to add an inhibitor such as sulfur to the material undergoing distillation. The inhibitor may be added at 16. If sulfur is used as inhibitor it will remain in the bottoms in fractionator 12 and will be discharged through conduit 15 with 2-vinylthiophene. For the purpose of removing the inhibitor in the 2-vinylthiophene in conduit 15 a flash still 17 may be provided. The inhibitor is discharged through outlet 18 from flash still 17 and the overhead vinylthiophene is recovered at outlet 19. Polymerized vinylthiophene and higher-boiling residual materials may be charged through line 20 to furnace 8 for further pyrolysis. The recovered inhibitor, if relatively free from contaminants, may be reused by charging it to inlet 16 at the top of fractionator 12.

The foregoing process is typical and by suitable substitution may be used for production of alkenylthiophenes generally from olefins and thiophene.

Olefins which may be used for the alkylation to produce the corresponding alkyl-substituted thiophenes are ethylene, propylene, 1-butene, 2-butene, isobutylene (2-methyl-1-propene), pentenes, etc.

Instead of starting with thiophene, substituted thiophenes may be used. For example, 3-methylthiophene may be further alkylated with ethylene according to the process of the invention and then dehydrogenated to give 2-vinyl-3-methylthiophene or some other isomer thereof. If one starts with a thiophene substituted with an ethyl or higher alkyl group this group may be dehydrogenated in the subsequent dehydrogenation step.

Sulfur has been disclosed herein as an inhibitor of the polymerization of vinylthiophene and other alkenylthiophenes. It may be used both in the distillation as described herein, being introduced at the top of fractionator 12, and to inhibit the polymerization of the product on storage, in which event its removal by distillation before use may be required. However, other polymerization inhibitors, for example, alkyl-substituted catechols and similar suitable alkyl-substituted phenols, may be used instead of or in conjunction with sulfur. The amount of inhibitor to be used is largely dependent upon the effectiveness of the inhibitor and upon the degree of inhibition that is desired. Normally, in distillation, to inhibit polymerization, an amount of sulfur within the range of 0.1 to 1 per cent by weight of the material in the column is generally sufficient, although more may be used if desired.

Instead of using a continuous process as described, the various operations may be performed in batchwise manner. Thus the various products may be condensed and reheated without relation to their utilization in a continuous manner.

It is to be understood that the foregoing description is merely exemplary and that in actual operations, pumps, heat exchanger, and other suitable equipment which are not illustrated on the drawing will be required. Distillation under reduced pressure, for example, particularly for the separation in fractionator 12, is contemplated and is desirable because of the increased tendency for polymerization of the alkenylthiophene as the temperature is raised. Because the boiling points of alkylthiophenes and the corresponding alkenylthiophenes are so close to each other, generally not differing by more than approximately 5° or 10° C., fractionating columns of great size (60 plates or thereabouts) are required and the period of sojourn in said columns is rather long. Consequently, for this reason also it is desirable to maintain as low a distillation temperature as possible.

The following table illustrates the closeness of the boiling points of some of the known alkylthiophenes and corresponding alkenylthiophenes:

Boiling ranges (° C.) of substituted thiophenes

| | |
|---|---|
| 2-ethyl- | 132°–134°. |
| 2-vinyl- | 62°–63°/50 mm. |
| 3-ethyl- | 135°–136°. |
| 2-propyl- | 157.5°–159.5°. |
| 2-allyl- | 158.5°–159°/732 mm. |
| 3-propyl- | 160°–162°. |
| 2-isopropyl- | 153°–154°. |
| 2-isopropenyl- | 166°–167°/727 mm. |
| 3-isopropyl- | 157°–158°/754 mm. |
| 2-butyl- | 181°–182°. |

Preferably solid alkylation catalysts are used for the alkylation, particularly those which have a neutral or alkaline reaction. Granular gel catalysts of the silica-alumina type are preferred, although acid catalysts consisting of phosphoric acid or phosphorus pentoxide deposited on a granular solid supporting material are also suitable. Solid catalysts of this type may and preferably are used under vapor-phase conditions of operation and generally within the temperature range of approximately 400° to approximately 700° F. However, alkylation in the liquid phase at lower temperatures may be adopted with catalysts such as phosphoric acid, sulfuric acid, anhydrous hydrogen fluoride, and hydrogen fluoride containing boron fluoride. When using the latter acid catalysts, provision must be made for maintaining sufficient pressure to obtain liquid-phase reaction conditions.

Suitable catalysts of the silica-alumina type are those prepared by subjecting partially dried silica gel to the action of a hydrolyzable salt of a metal of group III-B or IV-A of the periodic system. Such catalysts are described by Gayer (Industrial and Engineering Chemistry, 1933, volume 25, page 1122); Perkins et al. (U. S. Patent No. 2,107,710); McKinney (U. S. Patents Nos. 2,142,324 and 2,147,985); Fulton and Cross (U. S. Patents Nos. 2,129,649; 2,129,732 and 2,129,733); Chapman and Hendrix (Serial No. 371,209, filed December 21, 1940); and Hachmuth (Serial No. 370,558, filed December 17, 1940). A suitable catalyst of this class may be prepared by precipitation of hydrous silica gel, by the addition of a sodium silicate solution to a solution of sulfuric acid. The resulting gel is washed with water and then partially dried. The partially dried silica gel is then washed again with water and treated with a solution of aluminum sulfate and again washed. The treatment with aluminum sulfate and washing with water are repeated until sufficient aluminum compound is adsorbed on the gel and the material is thereafter dried, preferably at a temperature not substantially in excess of approximately 225° F.

Catalysts suitable for the vapor-phase dehydrogenation of alkylthiophenes to alkenylthiophenes include chromium oxide and molybdenum oxide, which may be used alone or supported on suitable catalyst carriers. A preferred catalyst is unglowed chromium oxide supported on alumina or bauxite. Other suitable catalysts are thorium oxide on alumina. An especially advantageous catalyst is one containing chromium oxide together with calcium oxide or other alkaline-earth-metal oxide and/or an alkali-metal oxide or hydroxide, or one such as is described in Corson and Cox Patent No. 2,311,979. Other suitable chromium oxide catalysts are described in the patents of Morey and Frey (No. 2,270,887); Matuszak (No. 2,294,414); Grosse (No. 2,172,534); Huppke and Frey (No. 1,905,383 and 2,098,959); and Visser and Engel (No. 2,249,337).

The dehydrogenation is preferably conducted under reduced pressure. This may be accomplished by diluting the reactants with an inert gas such as nitrogen, steam, or carbon monoxide.

The temperature which are used for the dehydrogenation are generally within the range of approximately 800° to approximately 1200° F. and preferably between 900° and 1100° F. As previously stated, low dehydrogenation temperatures may be used when catalysts are employed to facilitate the reaction.

The reaction mixture which is charged to the alkylator should contain a molecular excess of thiophene over olefin. Preferred ratios are within the range of 3 mols of thiophene to 1 mol of olefin to 6 mols of thiophene to 1 mol of olefin. The particular ratio which is most suitable for use with a particular olefin will depend to a great extent on the reactivity of the olefin and the particular alkylation reaction conditions. With ethylene, for example, a higher molecular ratio of thiophene to ethylene would be more desirable than with isobutylene.

As an example of the practice of the process of this invention, the following preparation of 2-vinylthiophene, which is a batchwise operation, is cited: Thiophene and ethylene are charged to a chamber containing a silica-alumina catalyst prepared according to the general method hereinabove described. The molecular ratio of thiophene to ethylene is 5 to 1 and the materials are heated to such temperature that the temperature of the catalyst bed is approximately 500° F. The products are condensed and then fractionally distilled. The thiophene (boiling range approximately 80° to 84° C.) is separated from the 2-ethylthiophene (boiling range approximately 130° to 135° C.).

Ethylthiophene as obtained above is then heated to a temperature of approximately 1000° F. by passing it through a tube and is then passed through a tube containing a chromium oxide catalyst supported on bauxite. The vapors are condensed and distilled fractionally in a 6-foot glass column packed with glass helixes to separate the undehydrogenated 2-ethylthiophene from the 2-vinylthiophene.

Substantial yields of 2-ethylthiophene and 2-vinylthiophene are obtained, although the conditions specified in the foregoing examples are not to be understood to be optimum conditions.

Although I have referred herein to the production of 2-alkenylthiophenes, and specifically to the production of 2-vinylthiophene, I am not as yet certain that this is the exact constitution of my products, that is, that the substituent is on the 2 or alpha carbon atom of the thiophene nucleus. The properties of the 2-vinylthiophene obtained by my process conform in general to the physical properties of the products described in the published art. It is quite likely that the crude product from the reaction of thiophene and ethylene contains vinylthiophenes in which the vinyl group is present on other carbon atoms of the thiophene nucleus. Furthermore, when propylene and higher olefins are used as alkylating agents, it is even more likely that the product is a mixture of isomers in which perhaps the 2 or alpha alkenyl isomer is predominant and the 3 or beta alkenyl isomer is also present, although this will depend to a large extent on the specific reaction conditions used. It is not to be understood, therefore, that the invention is limited otherwise than as described or claimed.

2-vinylthiophene and other alkenylthiophenes which can be obtained by the process of the present invention may be readily polymerized to products which are useful as plastics and which can be molded under heat and pressure and which are thermoplastic as contrasted to thermosetting plastic materials. They are also useful in the form of copolymers with 1,3-butadiene (erythrene), isoprene (2-methyl-1,3-butadiene) and piperylene (1,3-pentadiene), respectively, as "synthetic rubbers," namely, products which possess a high elasticity and resemble natural rubber in other respects. Such copolymers even surpass natural rubber in some properties.

This application is a division of my copending application Serial No. 511,893 filed November 26, 1943, and issued as a Patent No. 2,560,610 on July 17, 1951, which claims alkylation of a thiophene selected from the group consisting of thiophene and alkyl thiophene having a replaceable hydrogen atom attached to the thiophene nucleus with an olefin at 400 to 700° F. in the presence of a catalyst of the silica-alumina type.

I claim:

1. A process for the production of an alkenylthiophene which comprises dehydrogenation of an alkylthiophene.

2. A process as defined in claim 1 in which said alkylthiophene contains at least one alkyl group containing from two to five carbon atoms.

3. A process for the production of an alkenylthiophene which comprises dehydrogenation of an alkylthiophene at a temperature within the range of approximately 800 to approximately 1200° F.

4. A process for the production of an alkenylthiophene which comprises dehydrogenation of an alkylthiophene in the presence of a solid dehydrogenation catalyst at a temperature within the range of approximately 800 to approximately 1200° F.

5. A process as defined in claim 4 in which the dehydrogenation catalyst is a catalyst containing chromium oxide.

6. A continuous process for the production of an alkenylthiophene which comprises subjecting an alkylthiophene to dehydrogenation in the presence of a dehydrogenation catalyst at a temperature within the range of approximately 800 to approximately 1200° F., separating undehydrogenated alkylthiophene from the product of the dehydrogenation reaction and recharging it to the dehydrogenation catalyst, and separating and recovering alkenylthiophene from the product of the dehydrogenation reaction.

7. A process for the production of 2-vinylthiophene which comprises dehydrogenation of 2-ethylthiophene.

8. A process for the production of 2-vinylthiophene which comprises dehydrogenation of 2-ethylthiophene at a temperature within the range of approximately 800 to approximately 1200° F.

9. A process as defined in claim 8 in which the dehydrogenation catalyst is a catalyst containing chromium oxide.

10. A continuous process for the production of 2-vinylthiophene which comprises subjecting 2-ethylthiophene to dehydrogenation in the presence of a dehydrogenation catalyst at a temperature within the range of approximately 800 to approximately 1200° F., separating undehydrogenated ethylthiophene from the product of the dehydrogenation reaction and recharging it to the dehydrogenation catalyst, and separating by fractional distillation in the presence of an inhibitor of polymerization and recovering 2-vinylthiophene from the product of the dehydrogenation reaction.

11. A process as defined in claim 1 in which said alkylthiophene is an ethylthiophene.

12. A process as defined in claim 1 in which said alkylthiophene is a propylthiophene.

13. A process as defined in claim 1 in which said alkylthiophene is a butylthiophene.

14. A process as defined in claim 1 in which said alkylthiophene is an amylthiophene.

15. A process for the production of an alkenylthiophene which comprises dehydrogenation of an alkylthiophene having only alkyl substituents and containing at least one alkyl group of at least two carbon atoms attached to a carbon atom of the thiophene nucleus.

16. A process as defined in claim 15 in which said dehydrogenation is effected in the presence of a solid dehydrogenation catalyst at a temperature within the range of approximately 800 to approximately 1200° F.

17. A process as defined in claim 16 in which said dehydrogenation is effected in the presence of sufficient steam to accomplish at the pressure prevailing a partial pressure of said alkylthiophene of less than one atmosphere.

18. A process as defined in claim 4 in which dehydrogenation catalyst comprises chromium oxide on alumina.

References Cited in the file of this patent

UNITED STATES PATENTS

| Number | Name | Date |
|--------|------|------|
| 2,315,107 | Chickinoff et al. | Mar. 30, 1943 |
| 2,560,610 | Wagner | July 17, 1951 |

OTHER REFERENCES

Gilman: "Organic Chemistry," 2nd ed., vol., 1, pp. 25–26, John Wiley and Sons.

Sergienko: C. A., vol. 34 (1940), col. 5419.

Fieser and Fieser: Organic Chemistry, 2nd ed., 1950, D. C. Heath and Co., Boston; Rheinhold Pub. Corp., 330 W. 42nd St., New York, N. Y., page 847.